Patented May 23, 1933

1,911,004

UNITED STATES PATENT OFFICE

SVEND S. SVENDSEN, OF CHICAGO, ILLINOIS, ASSIGNOR TO CLAY REDUCTION COMPANY, OF CHICAGO, ILLINOIS, A CORPORATION OF ILLINOIS

MANUFACTURE OF SILICON-DIAMMINOTETRAFLUORIDE

No Drawing.  Application filed February 1, 1930.  Serial No. 425,345.

The present invention relates to the removal of silicon from silicious oxygen compounds, such as sand, quartz, talc, feldspar, beryl, etc., and particularly silicious oxygen compounds of alumina, such as, clays, for instance, fire and brick clays, bauxites, diaspore, kaolin, and the like, with ammonium fluoride, and will be fully understood from the following description thereof. This application is a continuation in part of my prior application, Serial No. 191,267, filed May 13, 1927.

In accordance with the present invention, a silicious material, suitably a mineral comprising a silicious oxygen compound, such as, quartz, clay, talc or the like, is subjected to the action of an ammonium fluoride, by which term I designate the normal ammonium fluoride as well as the bifluoride, which is commercially known as ammonium fluoride, and such materials, which, under the conditions of reaction, form ammonium fluoride. The ammonium fluoride, reacting with the silica, and specifically reacting therewithin the dry way, forms ammonia-silicon-fluorine compounds depending upon the proportions used, as is shown in the following equations, the silicon being recovered substantially as one or both of these compounds:

1. 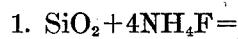 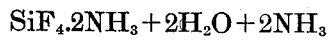
2. 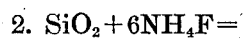 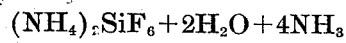

The silicon-diammino tetrafluoride formed in Equation 1, having the formula $SiF_4.2NH_3$, has the following physical properties. It vaporizes below 250° C., say at about 230° C. The vapor is colorless. On condensation, the silicon-diammino tetrafluoride solidifies, forming a white, fluffy, crystalline sublimate which is decomposed by water (below 100° C.) into ammonium silico-fluoride, ammonium fluoride and hydrated silica. By decomposition with water and ammonia, it is entirely dissociated at below 34° C. into ammonium fluoride and hydrated silica. At elevated temperatures, it is not attacked by water and ammonia vapors, but at about 400° C. it begins to dissociate into nitride of silicon and hydrofluoric acid when water vapor is present. Metals act similarly to water vapor. The ammonium silico fluoride, volatilizing at about 300° C. and formed as shown in Equation 2 and also by the decomposition of silicon-diammino tetrafluoride by water, is decomposed by ammonia in the presence of water into hydrated silica and ammonium fluoride. The reaction is complete at below 34° C.

When the raw material employed is a silicious oxygen compound practically free from metallic oxides, such as quartz, which must first be heated to a bright red heat and chilled in water to make it reactive, the reaction may be readily carried out by heating together the silicious oxygen compound and the ammonium fluoride in the proper proportions, as shown in Equations 1 and 2, to form ammonia-silicon-fluorine compounds, employing temperatures sufficient to volatilize the compounds. It is preferred to maintain the silicious material at a temperature above 100° C. before the addition of the ammonium fluoride, in order to eliminate water formed in the reaction as a vapor and thereby prevent caking of the charge and its adherence to the walls and stirring mechanism of the vessel in which the reaction is effected. The ammonium-fluoride is preferably added gradually in dry form to the charge. It is preferred to carry out the reaction at a temperature of 230° C. or higher to above about 300° C. so that the ammonia-silicon-fluorine compounds are volatilized. Preferably, only sufficient ammonium fluoride is added to the mixture to form silicon-diammino tetrafluoride so that a minimum of ammonium fluoride is used in the process. The reaction, even in the dry state, starts at room temperatures, ammonium silicofluoride being formed at low temperatures with the evolution of considerable heat. As the reaction mixture is further heated, the ammonium silico-fluoride reacts further with the reaction mass to form silicon-diammino tetrafluoride.

When the silicious materials which are employed contain metallic oxides, either free and/or combined with the silica, as in clay, talc, orthoclase, or the like, some metallic fluorides are formed during the reaction in addition to the ammonia-silicon-fluorine compounds. Unless the metallic fluorides are decomposed to allow their fluorine to react with the remaining silicious oxygen compounds, correspondingly increased proportions of the ammonium fluoride compound must be employed to form silicon-diamino tetrafluoride with the total silicon present. I prefer not to use an excess. Excess ammonium fluoride also results in the formation of ammonium silicofluoride which needs a higher temperature for its volatilization. If desired, the metallic fluorides thus produced may be reacted upon with sulfuric acid and the resulting hydrofluoric acid reconverted to ammonium-fluoride. As described in detail hereinafter, a reactive sulfate compound, such as ammonium sulfate, may be included in the reaction mixture for the formation of the silicon-diammino tetrafluoride and the recovery of the metallic oxide as a sulfate compound. The formation of metallic fluorides during the reaction may be retarded by keeping down the temperature of reaction (for example, to about 250° C.) and by introduction of ammonia alone or of superheated steam and ammonia during the reaction with the ammonium fluoride and during the volatilization of the silicon-diammino tetrafluoride. Metallic fluorides are dissociated into metallic oxides and fluorine compounds by superheated steam. Silicious oxygen compounds facilitate this reaction by lowering the reaction temperature.

The following example is illustrative of the present invention:

A kaolin clay is calcined to a temperature between 600° C. and 900° C., and preferably between 650° C. and 850° C., to increase its reactivity, and is pulverized to about 100 mesh or finer. The clay is then transferred to a suitable reaction chamber, such as a multiple hearth muffle-type furnace exteriorly heated and provided with stirring mechanism, and is heated to above 100° C.; say about 150 to 200° C. At above 200° C. excess volatilization of ammonium fluoride may occur. Ammonium fluoride is then added gradually in a proportion sufficient to convert silicon present into silicon-diammino tetrafluoride while substantially maintaining the temperature of the reaction mixture. The ammonium fluoride may be added at one time. Water vapor and ammonia are evolved and may be collected. It is probable that ammonium silicofluoride is formed during this stage of the reaction. The temperature is then raised to volatilize the silicon-diammino tetrafluoride, say to between 230° to 300° C. During this stage, ammonia or steam and ammonia formed in the preceding stage of the operation may be passed through the reaction mixture to volatilize the silicon-diammino tetrafluoride in the presence of ammonia and to retard the formation of metallic fluorides. Silicon-diammino tetrafluoride is formed and vaporized, and removed together with ammonia and water vapor, and collected, as by fractional condensation. When the evolution of silicon-diammino tetrafluoride vapors at this temperature is terminated, the temperature is raised to red heat, and steam at about the same temperature passed through the material to decompose the metallic fluorides in the presence of the remaining silicious compounds. The vapors evolved, which consist of silicon-fluoride and steam, may suitably be partially cooled and mixed with ammonia vapors, preferably previously evolved in the process, to form additional silicon-diammino tetrafluoride, which is condensed and collected. In the condensation of silicon-diammino tetrafluoride and ammonium silicofluoride vapors from these vapors driven off at different stages of the reaction, a temperature is preferably employed sufficiently low to condense these compounds, but sufficiently high to prevent the condensation of water vapor. Suitably, a temperature between 100° C. and 200° C. is employed.

The following equations illustrate the reactions which are believed to take place in the various stages of the reaction:

(3) $9Al_2O_3 \cdot 2SiO_2 + 72NH_4F = 9Al_2O_3 + 6SiO_2 + 12(NH_4)_2SiF_6 + 24H_2O + 48NH_3$ (4) $9Al_2O_3 + 6SiO_2 + 12(NH_4)_2SiF_6 = 5Al_2O_3 + 4Al_2F_6 + 6SiO_2 + 12SiF_4 \cdot 2NH_3 12H_2O$ (5) $(NH_4)_2SiF_6 + 2NH_3 = SiF_4 \cdot 2NH_3 + 2NH_4F$ (6) $4Al_2F_6 + 6SiO_2 + 3H_2O = 4Al_2O_3 + 6SiF_4 + 3H_2O$ (7) $6SiF_4 + 12NH_3 = 6SiF_4 \cdot 2NH_3$ The first two or more of these reactions may take place simultaneously, and these equations are intended merely to represent the course of the reactions evolved and to serve as a guide in stoichiometrical calculations. If fluoride compounds of the metals present are desired for any purpose, the final step of high temperature heating of the fluoride residue with water vapor resulting in the formation of silicon fluoride, as indicated by reaction (6) above, may be omitted, and used as such, or converted into other compounds, for example, as described in my prior application, Serial No. 191,267, above referred to.

In a modification of the method as above described, the residual material remaining after the first silicon-diammino tetrafluoride is driven off, and containing some metallic fluorides and silicious oxygen compounds, is treated at about 250° C. to 350° C. with a reactive sulphate, such as sulphuric acid, ammonium sulphate or ammonium bisulphate. If the reactive sulphate is sulphuric acid, ammonia gas, preferably previously evolved in the process, is allowed to react with the evolved silicon fluoride to form silicon-diammino tetrafluoride. If the reactive sulphate is bisulphate or sulphate of ammonia, silicon-fluoride-ammonia is formed directly by the reaction, the normal sulphate giving an excess of ammonia. Ammonium sulphate may be added to the silicious compound before the addition of the ammonium fluoride, since it does not react until the reaction between the silicious compounds and ammonium fluoride is completed.

In the above specific example, ammonium fluoride was used. A mixture of ammonium sulphate and calcium fluoride (fluor-spar) may be substituted entirely or in part for the ammonium fluoride. The conditions of reaction are modified somewhat, since the ammonium sulphate and calcium fluoride ordinarily do not react to form ammonium fluoride until about 350° C. is reached. However, the presence of reactive silicious oxygen compounds depresses the starting temperature of reaction to around 280° C. to 330° C. so that ammonium fluoride in substantially nascent condition and from it silicon-diammino tetrafluoride are formed at below that temperature. Other reactive metal fluorides, such as sodium fluoride, may be used. The calcium or other metal sulphate formed in the reaction between the ammonium sulphate and metallic fluoride remains as a metallic sulphate in the reaction chamber. The following is a specific example of this method, using bauxite as the silicious material and fluorspar as the source of flourine.

The pulverized bauxite, calcined at between about 375° C. and 600° C., preferably between 400° C. and 500° C., is mixed with the fluorspar and ammonium sulphate in the proportions required by the following schematic equations which are substantially the final reactions involved:

(8) $CaF_2 + (NH_4)_2SO_4 = 2NH_4F + CaSO_4$ (9) $SiO_2 + 4NH_4F =$
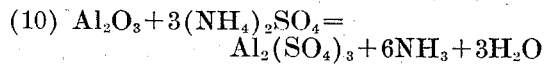
$SiF_4.2NH_3 + 2NH_3 + 2H_2O$

(10) $Al_2O_3 + 3(NH_4)_2SO_4 =$
$Al_2(SO_4)_3 + 6NH_3 + 3H_2O$

The reaction mixture is heated at about 330° C. until all of the silicon-diammino tetrafluoride ammonia and water vapor are evolved. The silicon-diammino tetrafluoride is condensed in the usual way and the ammonia collected. The residue in the furnace consists chiefly of aluminum and calcium sulphates: By using four parts of ammonium sulphate for each molecular weight of alumina in the bauxite, ammonia alum is formed instead of aluminum sulphate.

If talc is used as the raw material in the process, a magnesium compound and silicon-diammino tetrafluoride are formed. With lepidolite, lithium, potassium and aluminum compounds and silicon-fluoride-ammonia are formed. With beryl, beryllium and aluminum compounds and silicon-diammino tetrafluoride are formed. With orthoclase, feldspar, potassium and aluminum compounds and silicon-diammino tetrafluoride are formed.

If quartz is used as the raw material, it should be calcined at a red heat and quickly cooled to render it reactive. The reactivity of silica depends upon its physical state.

The reaction between the silicious material and the ammonium fluoride may be effected at temperatures lower than 100° C., a temperature of at least 34° C. being required for complete reaction. The ammonium fluoride may be used in solution, as a dry solid, or as a vapor. The following example illustrates an operation conducted with the use of a solution of ammonium fluoride:

Dried clay is mixed in any suitable mixing device, such as a hollander, with ammonium fluoride solution containing sufficient fluorine to convert the silicon into silicon-diammino tetrafluoride and the metallic oxides into fluorides. The mixture is heated to between 34° and 100° C., preferably near 100° C. The ammonium fluoride is dissociated into ammonia and ammonium bifluoride; the latter, on formation and in substantially nascent condition, reacts with the clay, forming normal fluoride, which is again decomposed. Ammonia gas is evolved and recovered. The reaction under these conditions may be regarded as producing first principally ammonium-silicofluoride $[(NH_4)_2SiF_6]$, metallic fluorides and metallic oxides. The mixture is evaporated to dryness and further heated; the ammonium silicofluoride gives off one-third of its fluorine content and this converts the remaining metallic oxides into fluorides. The ammonium silicofluoride is thereby converted into silicon-diammino tetrafluoride.

The mixture is now further heated to about 300° C., thereby volatilizing the volatile fluorides, principally silicon-diammino tetrafluoride. Fluorides of titanium and vanadium, if such metals are present, also volatilize as fluoride ammonia compounds, leaving the other metallic fluorides as a residue. The volatile fluorides are collected, at a temperature such as to condense the silicon-diammino tetrafluoride therefrom, as hereinbefore described.

The proportions of reagents used and products produced will, of course, depend upon the composition of the silicious material employed and may readily be determined stoichiometrically on the basis of the equations hereinbefore given. For example, assuming 120 tons of clay of the composition

| | Percent |
|---|---|
| Alumina | 25 |
| Silica | 60 |
| Ferrous oxide | 3 |
| Lime | 2 |
| Soda | 4 |
| Potash | 6 | then 262 tons of ammonium fluoride will be required to convert the silicon into silicon-diammino tetrafluoride and the metallic oxides into metallic fluorides in the process. 79.2 tons of ammonia gas are evolved and 165.6 tons of silicon-diammino tetrafluoride are formed.

As will be readily apparent, the reaction and the calculations for determining the quantities of reagents are greatly simplified when quartz or other silicious materials substantially free from metallic oxides is employed. For this reason, no specific example of the reaction carried out upon such a material has been specifically set forth.

If titanium compounds are present in the silicious oxygen compounds, as in most clays and bauxites, the titanium reacts with the ammonium fluoride in a manner analogous to the silicon reaction, that is, titanium fluoride ammonia is formed. Several titanium compounds of this type may be formed. These pass over at least partly with the silicon-diammino tetrafluoride and may be decomposed by water and ammonia to form titania and ammonium fluoride. Titanium and silicon are adjacent members according to their molecular weight in group IV of the periodic table and therefore have similar properties. Vanadium compounds also react under similar conditions to form volatile fluoride-ammonium compounds.

Although the present invention has been set forth hereinbefore in connection with specific details of processes for carrying it into effect, it is not intended that these details shall be regarded as limitations upon the scope of the invention, except insofar as included in the accompanying claims.

I claim:

1. The method of removing silica from materials containing the same which consists in subjecting said material in the dry way to the action of ammonium fluoride in quantity less than that required for complete conversion of the silica into fluosilicate, thereby converting the silica into silicon-diammino tetrafluoride ($SiF_4 \cdot 2NH_3$) and volatilizing said silicon-diammino tetrafluoride.

2. The method of removing silica from aluminum silicates which consists in heating said silicates with ammonium fluoride at a temperature sufficient to convert the silica into volatile ammonia-silicon-fluorine compounds including silicon diammino tetrafluoride and to volatilize said compounds.

3. The method of removing silica from material containing the same which consists in heating said material, together with ammonium fluoride, to a temperature around 300° C., thereby forming and volatilizing diammino tetrafluoride ($SiF_4 \cdot 2NH_3$) therefrom.

4. The method of removing silica from material containing same which consists in heating said material, together with ammonium fluoride, to a temperature around 300° C., thereby forming and volatilizing silicon-diammino-tetrafluoride ($SiF_4 \cdot 2NH_3$) therefrom.

5. The step in the method of removing silicon from a material comprising a silicious oxygen compound which comprises heating said material with ammonium fluoride in the dry way at a temperature high enough to effect a reaction to form ammonia-silicon-fluorine compounds.

6. The method of removing silicon from a material comprising a silicious oxygen compound which comprises subjecting said silicious material to a fluoride in proportion to convert said silicon into silicon-diammino tetrafluoride ($SiF_4 \cdot 2NH_3$) and volatilizing said silicon-diammino tetrafluoride.

7. The method of removing silicon from a material comprising a silicious oxygen compound containing aluminum which comprises calcining said material at such temperature that it becomes more reactive, and heating said calcined material with ammonium fluoride at a temperature of at least 230° C.

8. The method of removing silicon from a material comprising a silicious oxygen compound which comprises heating said material, together with ammonium fluoride, to a temperature above about 230° C., thereby forming and volatilizing silicon-diammino tetrafluoride ($SiF_4 \cdot 2NH_3$) therefrom.

9. The step in the method of removing silicon from a material comprising a silicious oxygen compound which comprises adding substantially dry ammonium fluoride to the substantially dry silicious oxygen compound while maintaining the reaction mixture at a temperature above 100° C.

10. The method of removing silicon from a material comprising a silicious oxygen compound which comprises gradually adding substantially dry ammonium fluoride to the substantially dry silicious oxygen compound heated to 100° to 200° C., and heating the reaction mixture to a temperature high enough to form and volatilize silicon-diammino tetrafluoride.

11. The method of producing silicon-fluoride-ammonia from a silicious oxygen compound which comprises treating a silicious oxygen compound with ammonium fluoride in the dry way, and passing ammonia through the reaction mixture while maintaining a temperature sufficient to volatilize silicon-diammino tetrafluoride.

12. The method of producing silicon-fluoride-ammonia from a silicious oxygen compound which comprises treating a silicious oxygen compound with ammonium-fluoride in the dry way, and volatilizing silicon-diammino tetrafluoride therefrom in the presence of ammonia derived from the first part of the process.

13. The method of removing silicon from a material comprising a silicious oxygen compound which comprises reacting upon said material with ammonium-fluoride at a temperature above 100° C., forming and vaporizing silicon-diammino tetrafluoride, and also forming residual products containing silicious compounds and metallic fluorides, and subjecting the residue of the reaction mixture at a red heat to the action of steam.

14. The method of removing silicon from a material comprising a silicious oxygen compound which comprises reacting upon said material with ammonium fluoride at a temperature above 100° C., heating to above about 230° C. to form and vaporize silicon-diammino tetrafluoride, and also forming residual products containing silicious oxygen compounds and metallic fluorides and subjecting said residual products to the action of steam at a red heat, thereby decomposing metallic fluorides formed with remaining silicious oxygen compound to form compounds containing silicon and fluorine.

15. In the production of silicon-diammino tetrafluoride from a silicious oxygen compound, the step of heating a metallic fluoride with steam in the presence of a silicious oxygen compound and forming silicon fluoride, and reacting thereupon with ammonia, thereby forming silicon-diammino tetrafluoride.

16. The method of removing silicon from a clay which comprises calcining a clay from 375° to 900° C., mixing said calcined clay with ammonium fluoride, and heating the mixture at a temperature of at least 230° C.

17. The method of removing silicon from bauxite which comprises calcining bauxite at about 375° C. to 600° C., mixing said calcined bauxite with ammonium fluoride, and heating the mixture at a temperature of at least 230° C.

18. In the method of removing silicon from a material comprising a silicious oxygen compound heating said material with a mixture of a metallic fluoride and ammonium sulphate in substantially dry state at a temperature at least high enough to decompose the fluoride by ammonium sulphate in the presence of the silicious oxygen compound, whereby nascent ammonium fluoride is formed at a temperature below its temperature of formation in the absence of the silicious compound, and is caused to react on the silicious compound.

19. In the method of removing silicon from a material comprising a silicious oxygen compound, heating said material with a mixture of a fluorspar and ammonium sulphate in substantially dry state at a temperature at least high enough to decompose the fluorspar by ammonium sulphate in the presence of the silicious oxygen compound, whereby nascent ammonium fluoride is formed at a temperature below its temperature of formation in the absence of the silicious compound, and is caused to react with the silicious compound.

20. In the method of removing silicon from a material comprising a silicious oxygen compound containing aluminum, heating said material with a mixture of a metallic fluoride and ammonium sulphate in substantially dry state at a temperature at least high enough to decompose the fluoride by the ammonium sulphate in the presence of the silicious oxygen compound, whereby nascent ammonium fluoride is formed at a temperature below its temperature of formation in the absence of the silicious compound, and reaction with the silicious compound is effected.

21. The method of removing silicon from a material comprising silicious oxygen compound containing aluminum which comprises calcining said material at such a temperature that it becomes more reactive, and heating said calcined material at a temperature of at least about 280° C. with a mixture of fluorspar and ammonium sulfate.

22. The step in the method of removing silicon as silicon-fluoride-ammonia from a silicious oxygen compound which comprises generating ammonium fluoride by heating a mixture of flourspar and ammonium sulfate in the presence of a silicious oxygen compound.

23. The step in the method of removing silicon as silicon-diammino tetrafluoride from a silicious oxygen compound which comprises forming and effecting reaction with ammonium fluoride by heating a mixture of a metallic fluoride and ammonium sulfate in the presence of a silicious oxygen compound.

24. The method of removing silicon from a material comprising silicious oxygen compound which comprises mixing said material with ammonium fluoride and heating at a temperature of at least about 230° C., the ammonium fluoride not being in excess of that required to form silicon-diammino tetrafluoride with the silicon of the silicious oxygen compounds in the reaction mixture.

25. The method of removing silicon and titanium from a silicious oxygen compound containing titanium, which comprises mixing and heating the compound with ammonium fluoride at a temperature high enough to volatilize silicon-diammino tetrafluoride and titanium compounds.

26. The step in the method of removing silicon and titanium from a silicious oxygen compound containing titanium, which comprises heating the compound with ammonium fluoride in the absence of water while maintaining the reaction mixture at a temperature above 100° C.

27. The method of producing fluoride ammonia compounds from oxygen compounds of silicon and titanium which comprises heating such compounds with ammonium fluoride in the absence of water.

28. In the method of removing silicon and titanium from oxygen compounds thereof, heating said material with a mixture of a metallic fluoride and a reactive sulfate in substantially dry state at a temperature at least high enough to decompose the fluoride by ammonium sulfate in the presence of the silicious oxygen compound, whereby forming nascent ammonium fluoride and causing reaction thereof with the silicon and titanium compounds.

29. The step in the removal of a metal in the group including silicon, vanadium and titanium from materials containing oxygen compounds thereof, which comprises heating such material with ammonium fluoride under dry conditions at a temperature high enough to form fluoride ammonia compounds of metals of said group.

30. The step in the removal of a metal in the group including silicon, vanadium and titanium from materials containing oxygen compounds thereof, which comprises heating such material with ammonium fluoride under dry conditions at a temperature high enough to form fluoride ammonia compounds of metals of said group, and volatilizing said flouride ammonia compounds.

31. The method of removing silicon from a material comprising silicious oxygen compounds in the form of silicon-diammino-tetrafluoride which comprises reacting upon said material with ammonium fluoride at a temperature above 100° C., forming and vaporizing silicon-diammino-tetrafluoride and also forming residual products containing silicious compounds and metallic fluorides and subjecting the residue of the reaction mixture at a red heat to the action of steam, thereby volatilizing silicon fluoride compounds and reacting thereon with ammonia.

32. In the method of removing silicon as volatile silicon fluoride compounds from a silicious oxygen compound in the presence of non-volatile metallic fluorides, the step of heating said mixture of non-volatile metallic fluorides and silicious oxygen compounds with steam to form silicon fluoride compounds, and reacting thereupon with ammonia, thereby forming silicon-diammino-tetrafluoride.

33. In the method of removing silicon as silicon diammino tetrafluoride from a silicious oxygen compound by means of ammonium fluoride, wherein a residual mixture of metallic fluoride and silicious compounds is formed, the step of removing residual silicon which comprises heating said residual mixture in the presence of superheated steam, thereby forming and volatilizing a silicon-fluorine compound.

34. The step in the treatment of a silicious oxygen compound which comprises heating at least sufficient ammonium fluoride in the dry way with said compound to volatilize substantially all the silicon therefrom.

35. The step in the treatment of a silicious oxygen compound which comprises heating said compound in the dry way with an excess of ammonium fluoride over that necessary to volatilize the silicon therefrom.

SVEND S. SVENDSEN.